(12) United States Patent
Ta et al.

(10) Patent No.: US 12,505,468 B2
(45) Date of Patent: Dec. 23, 2025

(54) TURRET SYSTEM AND METHOD FOR PORTABLE PROJECTION DEPLOYMENT

(71) Applicant: Productive Application Solutions, Inc., Sheridan, WY (US)

(72) Inventors: Peter Ta, Tucson, AZ (US); Gerald Maliszewski, San Diego, CA (US); Ian Laity, Escondido, CA (US); Mark Graham, Escondido, CA (US)

(73) Assignee: Productive Application solutions, Inc., Sheridan, WY (US)

( * ) Notice: Subject to any disclaimer, the term of this patent is extended or adjusted under 35 U.S.C. 154(b) by 69 days.

(21) Appl. No.: 18/412,480

(22) Filed: Jan. 13, 2024

(65) Prior Publication Data
US 2024/0152969 A1    May 9, 2024

Related U.S. Application Data

(63) Continuation-in-part of application No. 18/538,280, filed on Dec. 13, 2023, which is a continuation-in-part of application No. 18/477,402, filed on Sep. 28, 2023, which is a continuation-in-part of application No. 17/962,513, filed on Oct. 9, 2022, now Pat. No. 11,880,869, which is a continuation-in-part of application No. 17/830,783, filed on Jun. 2, 2022, now abandoned, which is a
(Continued)

(51) Int. Cl.
G06Q 30/02    (2023.01)
G06Q 30/0242    (2023.01)
G06Q 30/0251    (2023.01)

(52) U.S. Cl.
CPC ...... *G06Q 30/0266* (2013.01); *G06Q 30/0244* (2013.01); *G06Q 30/0252* (2013.01); *G06Q 30/0267* (2013.01)

(58) Field of Classification Search
CPC .......... G06Q 30/0266; G06Q 30/0244; G06Q 30/0252; G06Q 30/0267; G06Q 30/0265; G06Q 50/26; G09F 27/00; G09F 21/04; G09F 21/06; G09F 21/18; G09F 19/18; H04N 9/3147; H04N 9/3179; H04N 9/3194; G06F 16/487
See application file for complete search history.

(56) References Cited

U.S. PATENT DOCUMENTS

| | | | |
|---|---|---|---|
| 2014/0236344 A1* | 8/2014 | Kallin | B65H 9/163 700/218 |
| 2021/0201354 A1* | 7/2021 | Maliszewski | G06Q 50/40 |

* cited by examiner

*Primary Examiner* — Breffni Baggot
(74) *Attorney, Agent, or Firm* — Law Office of Gerald Maliszewski; Gerald Maliszewski

(57) ABSTRACT

A portable projection turret deployment is provided with a media projection subsystem (MPS). The MPS has a display surface aligned in a vertical plane, as is conventional. At a first time, the MPS display surface is rotated to align in a first horizontal direction, as viewed from a plan (top-down) perspective. Alternatively stated, a horizontal direction is the direction that the MPS display screen faces, or the direction in which the MPS projects visual information. At a second time, the MPS display surface is rotated in a second horizontal direction. The first horizontal direction may be orthogonal to the second horizontal direction. In one aspect, the MPS display surface can be rotated in a plurality of horizontal directions. In another aspect, the MPS display surface can be rotated (spun) in a horizontal circle.

22 Claims, 12 Drawing Sheets

Related U.S. Application Data continuation-in-part of application No. 17/830,412, filed on Jun. 2, 2022, which is a continuation-in-part of application No. 17/230,008, filed on Apr. 14, 2021, now Pat. No. 11,270,349, which is a continuation-in-part of application No. 17/201,419, filed on Mar. 15, 2021, now Pat. No. 12,112,352, which is a continuation-in-part of application No. 17/179,574, filed on Feb. 19, 2021, now Pat. No. 11,257,120, which is a continuation-in-part of application No. 17/168,313, filed on Feb. 5, 2021, now Pat. No. 12,106,327, which is a continuation-in-part of application No. 17/133,722, filed on Dec. 24, 2020, now Pat. No. 11,055,743, which is a continuation-in-part of application No. 17/097,256, filed on Nov. 13, 2020, now Pat. No. 11,887,163, which is a continuation-in-part of application No. 17/071,043, filed on Oct. 15, 2020, now Pat. No. 11,037,199, which is a continuation-in-part of application No. 17/023,546, filed on Sep. 17, 2020, now Pat. No. 10,991,007, which is a continuation-in-part of application No. 17/007,575, filed on Aug. 31, 2020, now Pat. No. 11,468,477, which is a continuation of application No. 16/869,696, filed on May 8, 2020, now Pat. No. 10,803,488, which is a continuation of application No. 16/601,362, filed on Oct. 14, 2019, now Pat. No. 10,796,340.

(60) Provisional application No. 63/480,743, filed on Jan. 20, 2023, provisional application No. 63/431,214, filed on Dec. 8, 2022, provisional application No. 63/310,857, filed on Feb. 16, 2022, provisional application No. 62/779,972, filed on Dec. 14, 2018.

DATA FILE 126

| MESSAGE | LOCATION | TIME |
|---|---|---|
| 200-1 | A | 2:00 PM |

| IP ADDRESSES | LOCATION | TIME | MESSAGES |
|---|---|---|---|
| IP1 | A | 2:00 PM | 200-1 |
| IP2 | A | 2:00 PM | 200-1 |
| IP3 | A | 2:00 PM | 200-1 |
| IP1 | B | 2:10 PM | 200-0 |
| IP4 | B | 2:10 PM | 200-0 |

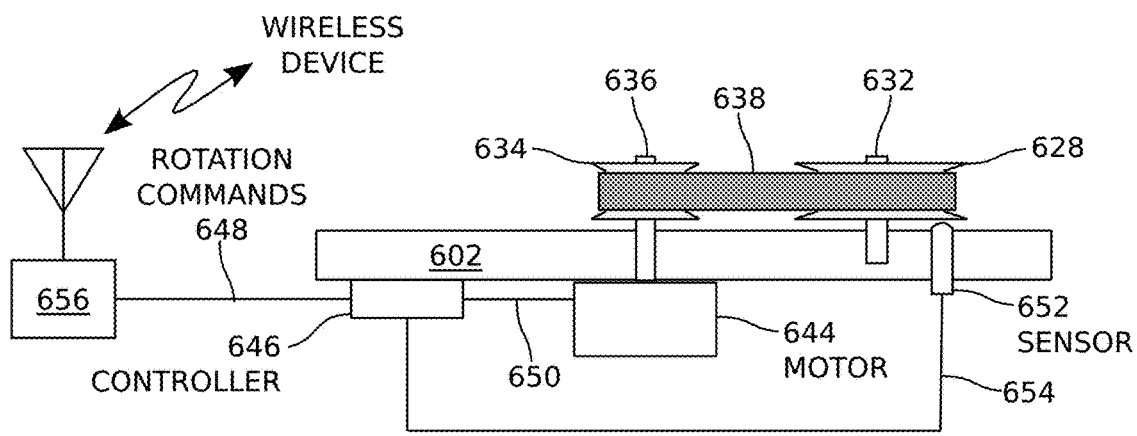
Fig. 6E
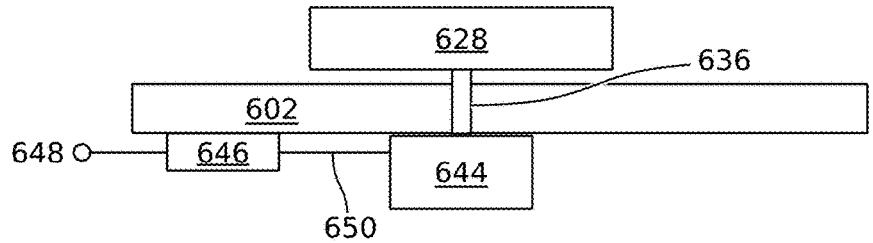
Fig. 6F
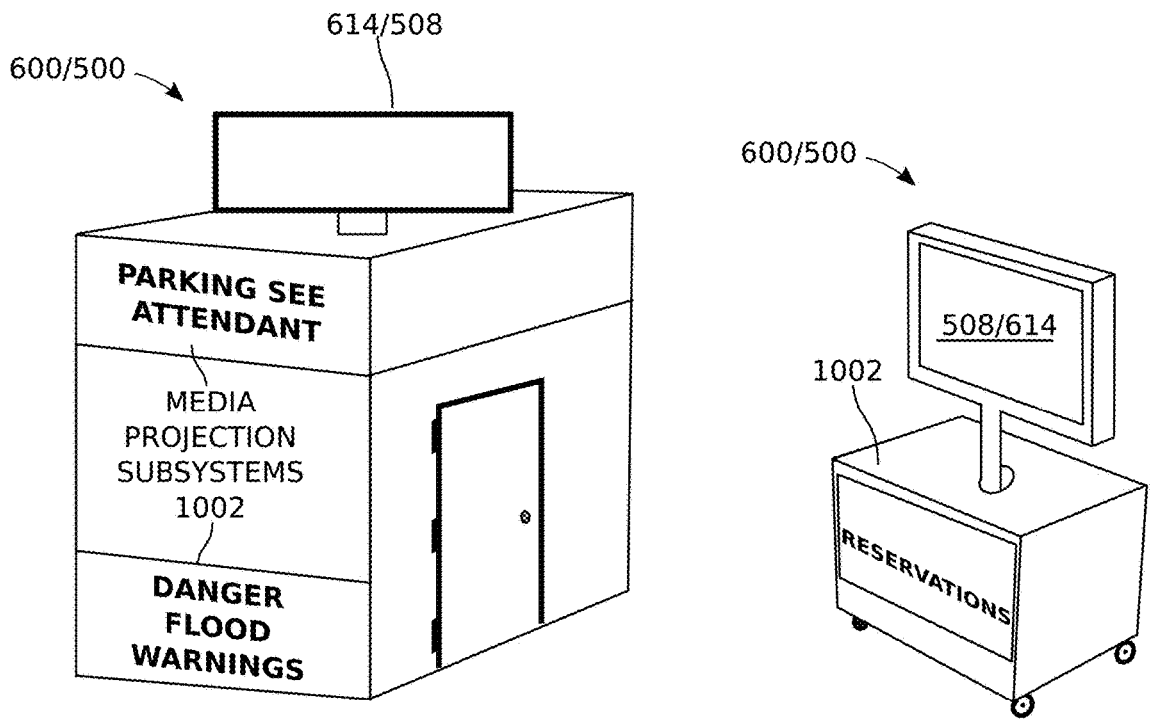
Fig. 10A
Fig. 10B

TURRET SYSTEM AND METHOD FOR PORTABLE PROJECTION DEPLOYMENT

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

1. Field of the Invention

This invention generally relates to public information services and, more particularly, to a system and method for optimizing the viewing angles of public service messaging.

2. Description of the Related Art

Market research shows that outdoor public announcement space has increasingly become harder to find. At the same time, automotive vehicles are one of the most costly expenses incurred by the average consumer. Ironically, most automobiles sit idle for a large portion of the day. U.S. Pat. No. 10,796,340, entitled SYSTEM AND METHOD FOR TARGETING THE DISTRIBUTION OF MEDIA FROM A MOBILE PLATFORM, invented by Peter Ta et al., and filed on Oct. 14, 2019, addresses the problem of finding more public notification space by providing an automotive targeted parking system that adds to an automobile the additional feature of a public notice display subsystem, and which may also include a Wireless Local Area Network (WLAN) IEEE 802.11 (WiFi) access point (hotspot).

While the above-described system addresses the provision of additional outdoor public notice through the use of automobiles, the act of parking remains a potential issue. Parking in many desirable locations in metropolitan areas is often limited to one or two hours only. Further, the necessity of frequently changing parking spots can become a burden and may make the use of their automobile as a public notification node impractical for some owners. Parent U.S. Pat. No. 10,991,007, entitled AERIAL BILLBOARD, invented by Peter Ta et al, and filed on Sep. 17, 2020, provides for the use of aircraft, such as unmanned aerial vehicles (UAVs), as another type of public notification platform.

Another potential problem to be addressed is that a display mounted on a vehicle may not be optimally oriented for viewing, or is only aligned for optimal viewing in one particular direction.

It would be advantageous if the orientation of a vehicle mounted display could be optimized for best viewing.

It would be advantageous if open cockpit vehicles could be enabled to safely present public interest messaging.

It would be advantageous if open cockpit vehicles could be used as a geofencing access point.

SUMMARY OF THE INVENTION

A system and method are disclosed herein for media message projection specifically designed for use with open cockpit vehicles such as scooters, motorcycles, and skateboards. Open cockpit vehicles spend much of their time curbside, making them available for the projection of public service messages. As stationary media projectors, the messages are relatively easy for passersby to understand. When in motion, the vehicles may be equipped to project map images on the street. These street-projected maps promote driver and pedestrian safety, as this method is inherently less risky than a driver relying upon a handheld smartphone to follow directions. Messages being projected on the street in front of, beside, or behind a moving open cockpit vehicle can also be viewed by vehicle passengers or passing pedestrians. Also provided is a turret system that permits a vehicle mounted display to be shifted to a plurality of viewing positions, or even rotated.

Accordingly, a method is provided for open cockpit vehicle public interest messaging. The method uses an open cockpit vehicle with a media projection subsystem (MPS) configured to project media messages. Typical media messages may include emergency broadcasts, public service, and community organization notices. In response to monitoring motion proximate to the vehicle, the MPS is selectively enabled, projecting a media message on a road surface adjacent to the vehicle. The monitoring of motion proximate to the vehicle includes detecting open cockpit vehicle movement, a change in imaging proximate to the vehicle, or a change in audio level proximate to the vehicle, with the MPS being enabled in response to the detected motion. Alternatively, motion monitoring may determine that the open cockpit vehicle is stationary, with a lack of vehicle movement; and the MPS is enabled in response to the lack of vehicle movement.

In one aspect, a library with a plurality of media messages is provided. Then, the method selects a media message from the library and the MPS is enabled to project the selected media message. The library may be populated with media messages that are wirelessly received. In another aspect, the method determines the geographic location of the vehicle. If the library of media messages is cross-referenced to geographic locations, then the MPS may be enabled to project a particular media message in response to determining the geographic location. Verification information may be stored in memory with content including the media message selected for projection, a cross-referencing time, and/or a cross-referencing geographic location. The verification information may be locally stored for subsequent downloading or wirelessly communicated to a server. Likewise, the Internet Protocol (IP) addresses of proximate pedestrians or vehicle users may be wirelessly collected and stored in a memory.

In one aspect, the vehicle includes a mapping software application that supplies a map image corresponding to a determined geographic location, and the MPS can be enabled to project the map image. For example, the MPS may project an image on the road in the direction of vehicle movement.

A method for portable projection turret deployment provides a turret system with a MPS. The MPS has a display surface aligned in a vertical plane, as is conventional. At a first time, the MPS display surface is rotated to align in a first horizontal direction, as viewed from a plan (top-down) perspective. Alternatively stated, a horizontal direction is the direction that the MPS display screen faces, or the direction in which the MPS projects visual information. At a second time, the MPS display surface is rotated in a second horizontal direction. The first horizontal direction may be orthogonal to the second horizontal direction. In one aspect, the MPS display surface can be rotated in a plurality of horizontal directions. In another aspect, the MPS display surface can be rotated (spun) in a horizontal circle.

The method may be enabled to track a target proximately located with the turret system and the MPS display surface can be rotated to face the target. In one aspect, the method may detect the motion of a station upon which the turret system is mounted, and the MPS display surface may be rotated in the first horizontal direction when the station is in motion. The MPS display surface may be rotated in the second horizontal direction when the station is detected to be at rest.

Additional details of the above-described methods, a turret system for portable projection deployment, and a system for open cockpit vehicle media projection are provided below.

BRIEF DESCRIPTION OF THE DRAWINGS

FIGS. 6A through 6F depict another variation of the turret system for portable projection deployment.

FIGS. 10A and 10B are diagrams depicting kiosks enabled with rotating turret MPSs.

DETAILED DESCRIPTION

Figures 1, 2A:
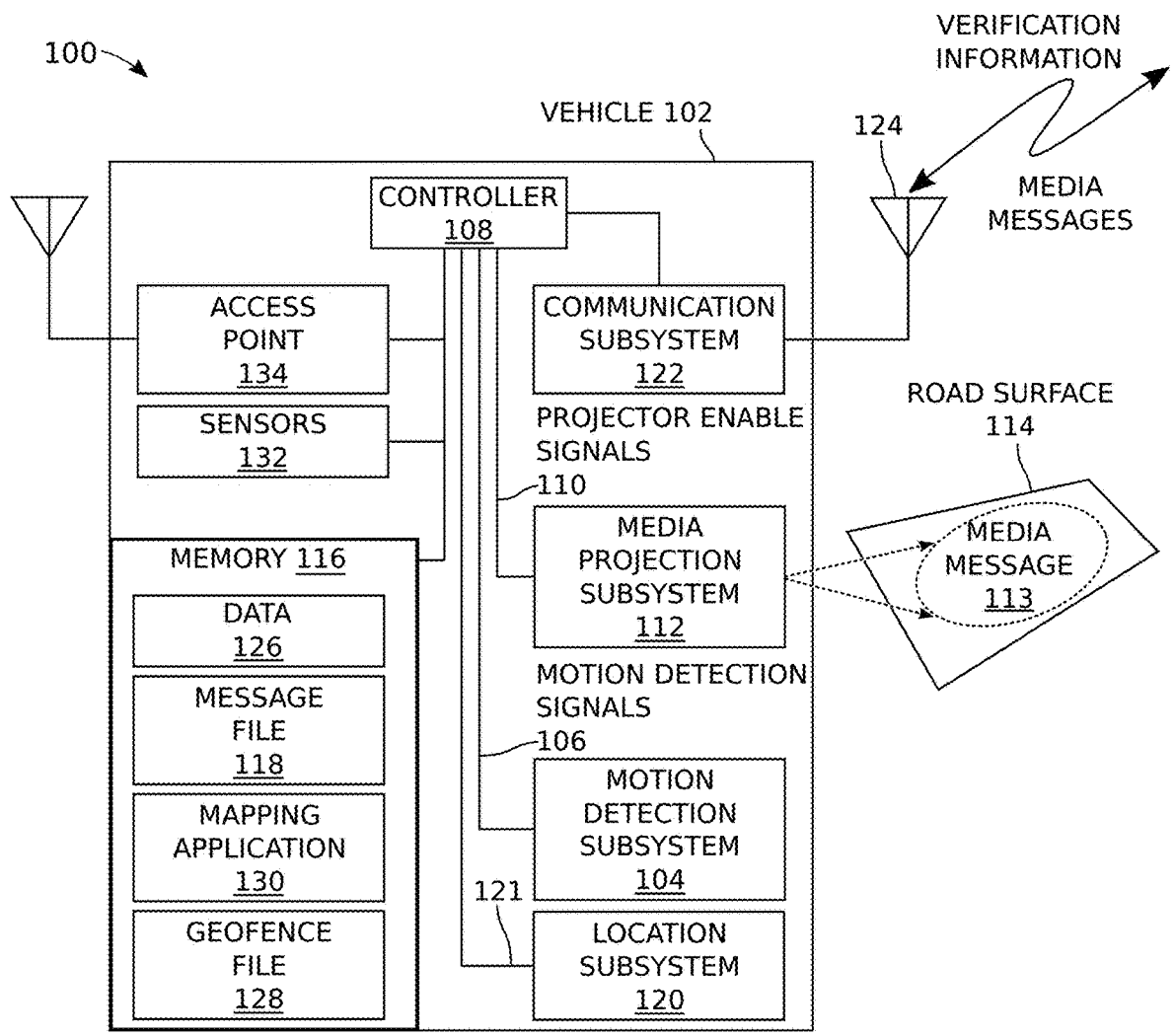
FIG. 1 is a schematic block diagram of an open cockpit vehicle media projector system.
FIGS. 2A, 2B, and 2C are diagrams depicting, respectively, an exemplary message file, an exemplary data file, and an exemplary geofence file.

FIG. 1 is a schematic block diagram of an open cockpit vehicle media projector system. The system 100 comprises an open cockpit vehicle 102. Some examples of an open cockpit vehicle include 2-wheeled vehicles, motorcycles, scooters, tuk-tuks, skateboards, unicycles, bicycles, tricycles, quad-wheeled vehicles, Segway-like devices, and rickshaws. However, the system is not limited to any particular type of vehicle, and the system can also be implemented in conventional automobiles, trucks, aerial drones, and even boats. A motion detection subsystem 104 is configured for attachment to the vehicle 102, having an interface on line 106 to supply motion detection signals. A controller 108 is attached to the vehicle 102 to selectively supply projector enable signals on line 110 in response to the motion detection signals. A media projection subsystem (MPS) projector 112 is attached to the vehicle 102 to project a media message 113 on a road surface 114 adjacent to the vehicle in response to the projector enable signals on line 110. As used herein, a road surface is understood to be any surface capable of supporting the vehicle, such as a sidewalk, earth, or grass surface. Alternatively, the projection surface may be a wall adjacent to the vehicle. Some examples of media messages include emergency safety broadcasts, public service, and community organization notices. In this example the controller 108 is shown as a separate block, such as might represent a hardware device enabled, for example, using combinational logic devices or an application-specific instruction set processor (ASIP), with corresponding software instructions. Alternatively, the controller may a software application including a sequence of processor instructions for performing the MPS enablement functions. In this case, the system would typically include a general purpose processor (not shown) and non-transitory memory, and the lines connected to the controller would be enabled as a wireless or hardwired conventional computer bus.

The motion detection subsystem 104 may include one or more of the following devices: an accelerometer, a camera, a photodetector, a location subsystem (e.g., a Global Positioning Satellite (GPS) receiver), or a microphone. Thus enabled, the motion detection subsystem 104 detects motion such as the vehicle accelerating, the vehicle changing positions, a change in imaging proximate to the vehicle (e.g., a pedestrian passing the vehicle), or a change in audio level proximate to the vehicle. Thus, depending on particular enablement and desired trigger, the system is able to project a media message when the vehicle begins to move, when the vehicle is in motion, if an object approaches the (stationary) vehicle, or if an object or driver passes by the vehicle when it is moving or, alternatively, when it is stationary.

Alternatively or in addition, the motion detection subsystem 104 may determine that the open cockpit vehicle is stationary, with a lack of vehicle movement. In this aspect, the controller 108 may supply the projector enable signal in response to the lack of vehicle movement. In this case, the vehicle may act as a stationary media message projector until such time as the vehicle is set in motion.

In one aspect, a non-transitory memory 116 is attached to the vehicle 102, and a message file 118 in the memory includes a plurality of media messages. In this case, the controller 108 is able to selects media messages for projection from the messages file 118.

Figures 2B, 2C, 3A:
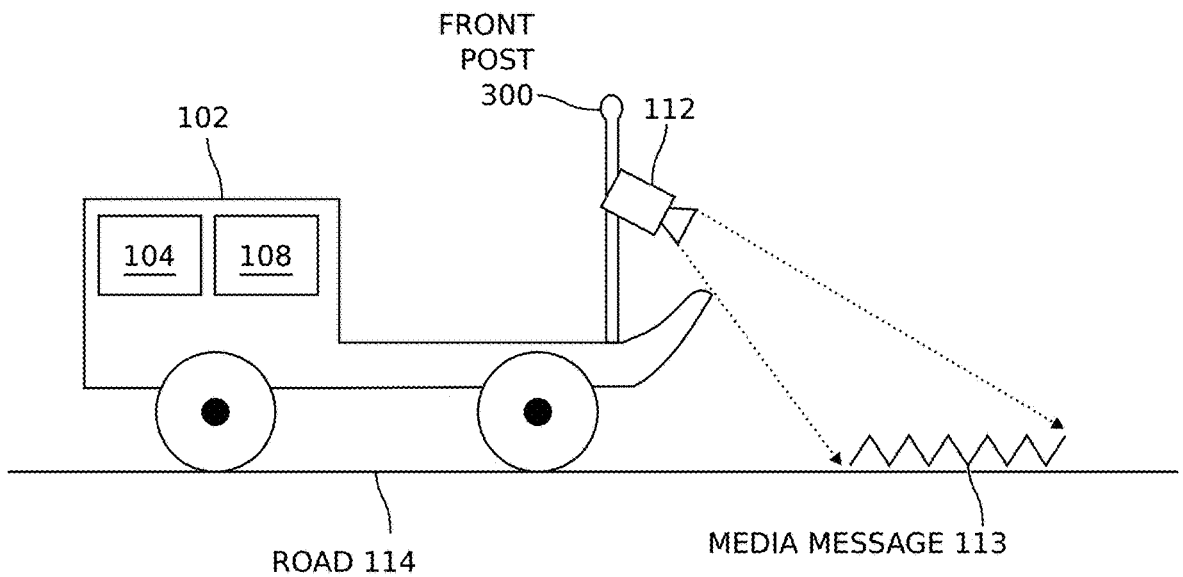
FIGS. 3A through 3E depict exemplary vehicles equipped for media message projection.

FIGS. 2A, 2B, and 2C are diagrams depicting, respectively, an exemplary message file, exemplary data file, and Internet Protocol (IP) data file. The message file 118 includes media messages 200-1 through 200-n, where n is an integer greater than one. In one aspect, each of a first plurality of media messages (e.g., messages 200-1 and 200-2) stored in the message file 118 is cross-referenced to at least one corresponding geographic location (e.g., locations A, B, and C).

Returning to FIG. 1, a location subsystem 120, if not already included as a component of the motion detection subsystem 104, may be configured for attachment to the vehicle 102 to supply a determined geographic location of the vehicle to the controller 108 on line 121. Again, if the controller is enabled as a combination of a controller software application and general purpose processor, the geographic location information may be supplied via a computer bus line. Then, the controller 108 is able to select media messages from the first plurality of media messages in the message file 118, in response to the determined geographic locations. The memory 116 may further include a data file 126.

FIG. 2B depicts an exemplary data file. In this example, the controller is able to store verification information in the data file with content including the identification of the media message selected for projection (e.g., message 200-1), a cross-referencing time (e.g., 2 PM), and a cross-referencing geographic location (e.g., location A). Although not explicitly shown in the drawing, the collected data may also be cross-referenced to the type of vehicle collecting the data.

Returning to FIG. 1, a communications subsystem 122 may be configured for attachment to the vehicle, having an interface to receive verification information from the controller including the geographic location. The communications subsystem may include a wireless interface (e.g., antenna 124) to transmit the verification information, but in other aspects the verification information is stored in memory and the communications subsystem is hardwired (e.g., Ethernet or Universal Serial Bus (USB)). The controller 108 may supply a projector enablement signal, with the verification information supplied to the communications subsystem 122, in response to a media message being projected. Thus, the communications subsystem 122 may transmit verification information including the identification of a particular media message being projected by the MPS projector, cross-referenced to time, and optionally, other data being collected.

As another option, the communications subsystem 122 may receive media messages via the wireless interface 124 and the controller 108 stores the media messages in the message file 118. Further, if the location subsystem 120 determines that the vehicle is in a first geographic location (e.g., location A), and the communications subsystem receives, via the wireless interface, a first media message cross-referenced to the first geographic location, the controller 108 may select the first media message for projection when the vehicle is proximately located with the first geographic location.

FIG. 2C depicts an optionally IP file 128 for storing Internet Protocol (IP) addresses received via the communications subsystem wireless interface. The IP addresses may be cross-referenced to location, time, and media messages being presented. The open cockpit vehicles may act as a mobile center as described in parent application Ser. No. 18/538,280.

In addition, the memory 116 may include a mapping software application 130 stored in the memory receiving the geographic location from the controller to supply a map image corresponding to the geographic location, which the MPS projector is able to project.

FIGS. 3A through 3E depict exemplary vehicles equipped for media message projection. Shown in FIG. 3A is a 2-wheel scooter with the MPS projector 112 mounted on the front post 300. Alternatively but not shown, the MPS projector may be mounted on the handlebars. In this example, the motion detection subsystem 104 determines the direction of vehicle movement and the MPS projector 112 projects an image on the road surface in the direction of vehicle movement.

Figure 3B:
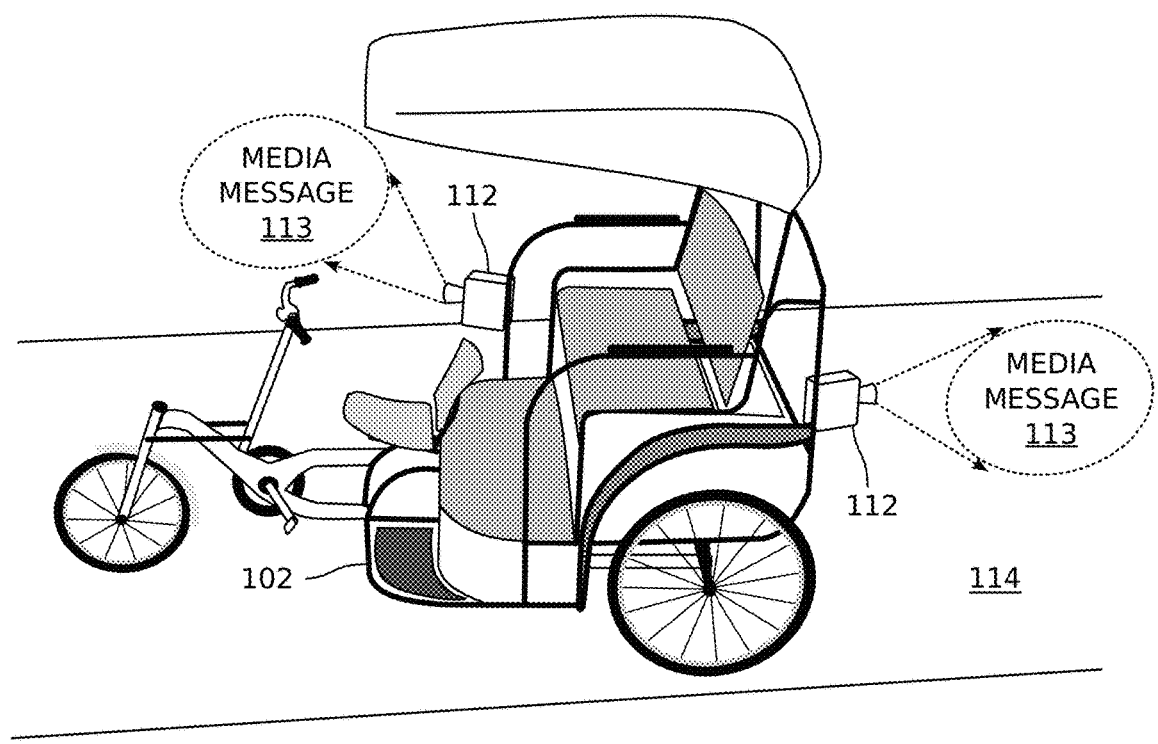

FIG. 3B is a perspective view depicting a tuk-tuk vehicle 102 projecting media messages 113 from the side and the rear of the vehicle.

Figure 3C:
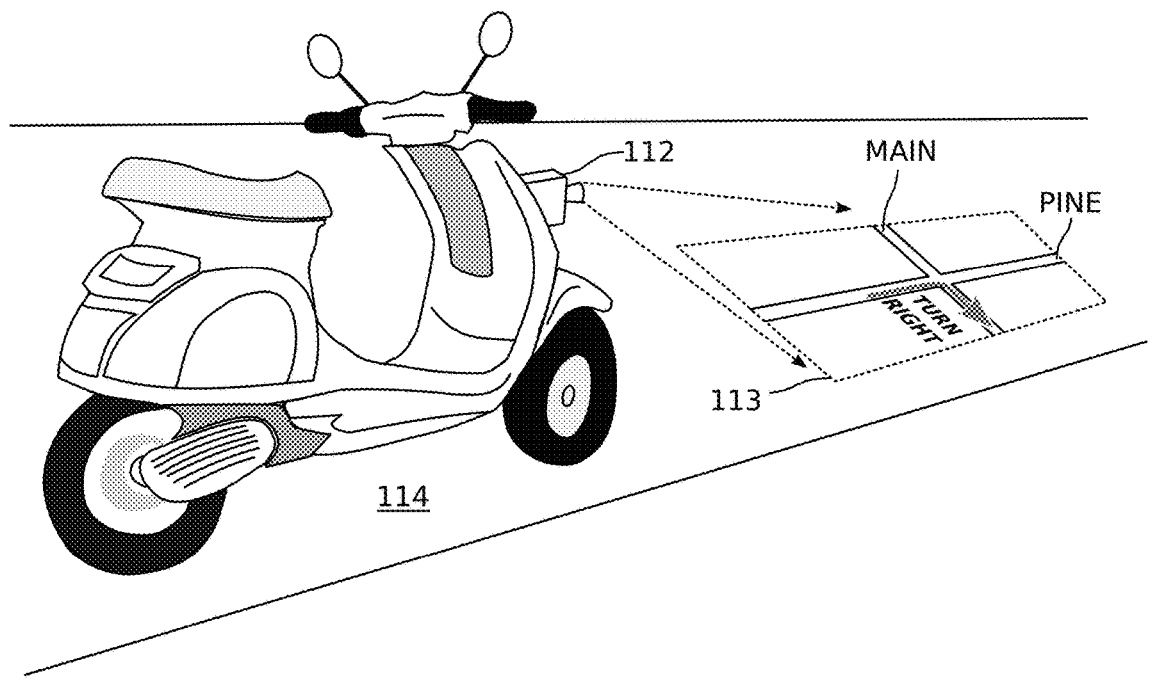

FIG. 3C is a perspective view of a skateboard vehicle 102 projecting a map as a media message in the direction of vehicle travel.

Figure 3D:
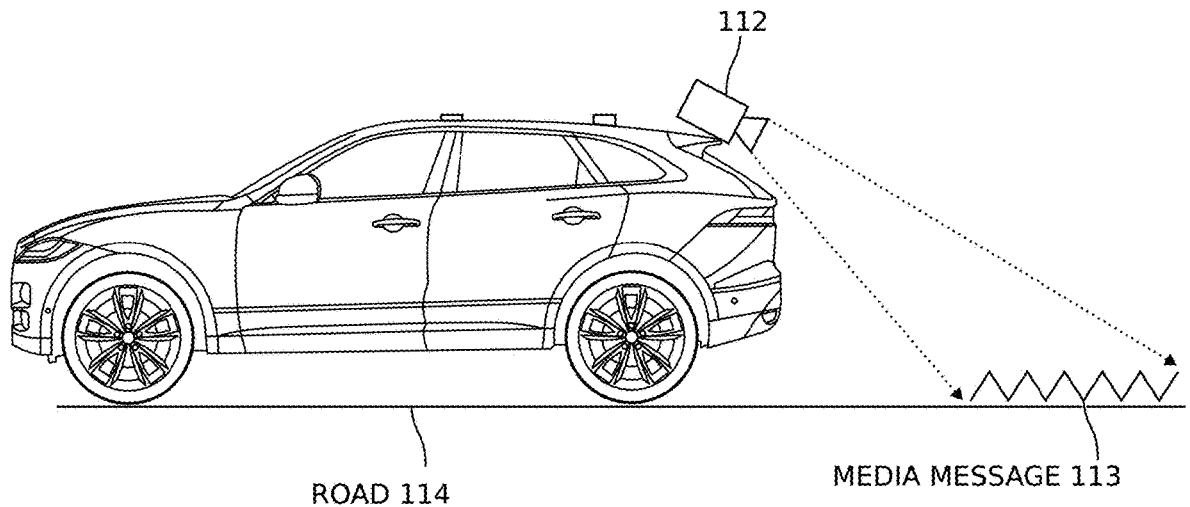

FIG. 3D is a view depicting a conventional car (closed cockpit) vehicle projecting a media message to the rear of the vehicle. Although the system described herein has been primarily presented for use with open cockpit vehicles, it is not limited to any particular type of vehicle.

Figure 3E:
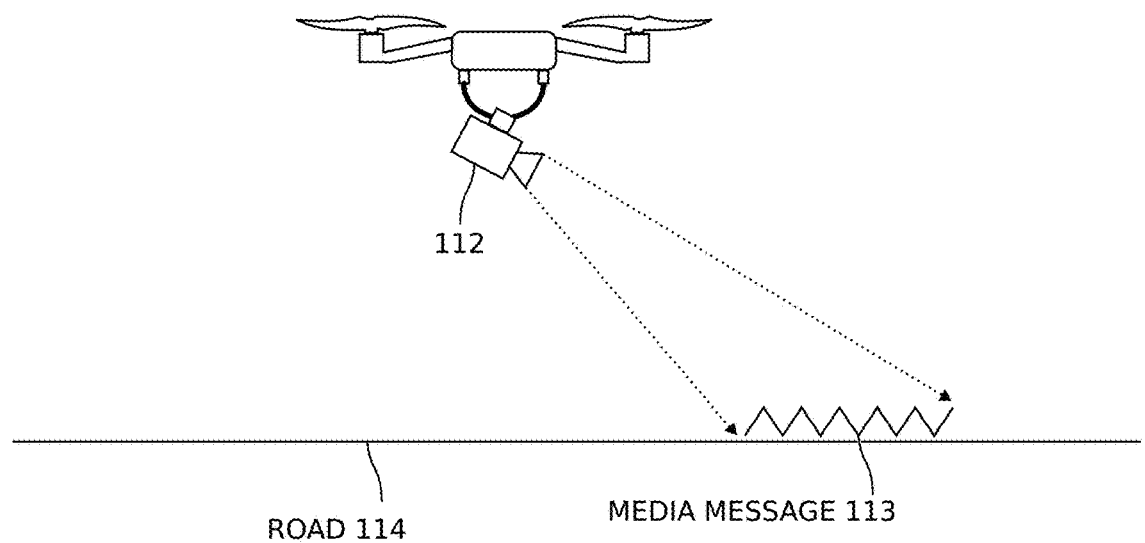

FIG. 3E is a view depicting aerial drone vehicle projecting a media message. Although the system described herein has been primarily presented for use with open cockpit ground vehicles, it is not limited to any particular type of vehicle. Although not explicitly shown, the system can also be adapted for use with nautical craft and buoys, in which case the messages may be projected on the water surface or adjacent land feature, or as a hologram.

The system described herein may be used for the purpose of collecting client device data and the identification of a vehicle in particular geofenced areas. Geofencing is the application of a virtual boundary around a location, in which certain rules are applied when a mobile device enters or leaves. The size of a geofence can be modified, but most often the shape is a standard radius. A polygon geofence, or boundaries that are more geometric in shape, is another form of geofencing that can more specifically outline the shapes of certain landmarks, buildings, or areas. A GPS receiver or other form of location system is typically used to define whether a device has entered or exited the geofence.

The most basic method of location-based geofencing is by placing a radius around the address of a static location. Events that gather numerous people together who are similarly interested in a topic, whether it be a sporting event, corporate conference, rock concert, or renaissance festival, can also be made a geofencing radius center. For example, a virtual geofence can be drawn around an event location where a target audience event is scheduled. When event attendees enter the geofenced location and check their phone to post to social media or check the weather, the geofence captures their data. The event attendees then become part of a custom audience that can be served public notifications during the event, and even after the event when the attendee exits the geofence. One problem associated with geofencing occurs when center radius moves. That is, a problem exists when the geofence center is not a stationary or known location but is, rather, an event or a mobile center unit moving in a non-predetermined or unpredictable manner.

Conventional geofencing services, such as provided by Radar Labs, Inc., use GPS, Global Navigation System (GNSS), radio frequency identification (RFID), WiFi, cellular data, and Internet Protocol (IP) address ranges, to build virtual fences in geographic regions. These virtual fences can be used to track the physical location of a device (e.g., smartphone) active in the particular region or the fence area. The location of the person using the device is taken as data and can be used to construct a picture of IP traffic in those areas. In some aspects the system described herein may be enabled with Bluetooth and/or a WiFi access point, and is capable of collecting the IP addresses of devices seeking service or devices using a wireless service provided by the open cockpit system.

Sensors 132 on the vehicles may be used to collect local environment data, as described in parent application Ser. No. 17/983,545 for example, which can be stored in memory as data or reported back to the server. Some examples of an environmental sensor include a camera, microphone, weather sensor, odor sensor, photodetector, chemical sensor, a wireless spectrum receiver, a wireless service traffic analyzer, radiation sensor, and air quality monitor.

Some locations may be weighted to have a greater value than other locations. For example, locations that have greater foot traffic or greater visibility may have more value. Further, vehicles may have a value weighted based upon whether they are stationary or moving, the duration of time they are stationary or moving, and their ability to report their stationary/movement status. In the case of an airborne vehicle, "parking" may be understood to be maintaining an approximate location in midair, as well as a landing location. In the case of air or nautical media nodes, the launching site, landing site, or midair position may be the stationary or parking location.

A "stationary location" may be a parking location. "Parking" is typically understood to be location where a vehicle media node is temporarily left with its engine off, or if not self-powered, left without means of movement. Vehicle mobile centers or media units may be "parked" along city streets, on sidewalks, in publically accessible buildings, or in publicly accessible areas, such as parking lots. Vehicles are typically parked for limited durations of time, typically a matter of hours, but the durations can be as small as minutes or larger than even weeks. "Temporary" is understood to typically be a duration of several minutes to several hours, although it may also be a matter of days or even weeks. "Occupation" is understood to mean filling a space or location so completely that another vehicle or entity is unable to fill that space. In the case of drone aircraft or boat mobile unit, these vehicles may need to be powered with engines running to maintain a stationary location. The weighted values can be established using conventional geofencing services, such as provided by Radar Labs, Inc or message source preferences.

The MPS image projector 112 may be enabled as a LC or LED display similar to a home theater type video projector. Alternatively, high performance (e.g., mercury arc or xenon arc) lamps, cathode ray tube (CRT), digital light processing (DLP), plasma, silicon X-tal reflective display (SXRD), or red-green-blue (RGB) lasers may be used. As another alternative, projector equipment may be used that is capable of creating holographic images. In other words, the MPS may present a 2-dimensional or 3-dimensional image, which may or may not be transitory. Transitory images include a series of still images, videos, or combinations thereof. The media node may also broadcast audio messages, or a combination for audio and visual messages.

The vehicle 102 may further comprise a publically accessible access point (AP) 134, such as an IEEE 802.11 Wireless Local Area Network (WLAN) AP, an IEEE 802.15 Wireless Personal Area Network (WPAN) AP, and combinations thereof. In this case the communications subsystem may enable AP data traffic via a communications subsystem cellular network. Alternatively, the AP may act as the communications subsystem, especially if the relaying devices are located nearby. Less common, the access point may an IEEE 802.15.4 Zigbee, WPAN IEEE 802.15 Li-Fi or wireless USB device. Even more unlikely as an access point are Long Range Wireless systems. As used herein, a "publically accessible" communications subsystem or AP is a system that can be accessed by the general public without a password or similar security measures, or where the password is publically distributed. One example of a publically accessible AP is the WiFi hotspot service provided by a typical Starbucks coffee shop. In the case of a password being required for access, the password may be printed on the mobile platform, displayed by the media projection subsystem, or made available through a media projection phone application or website.

The location subsystem 120 may be a GPS system receiver, GNSS, assisted GPS or GNSS taking advantage of cell tower data, a Wireless Local Area Network IEEE 802.11 (WiFi) positioning system, cell-site multilateration (e.g., Skyhook), satellite multilateration, or a hybrid positioning system. Hybrid positioning systems find locations using several different positioning technologies, such as GPS, combined with cell tower signals, wireless internet signals, Bluetooth sensors, IP addresses, and network environment data. Cell tower signals have the advantage of not being hindered by buildings or bad weather, but usually provide less precise positioning. WiFi positioning systems may give very exact positioning in urban areas with high WiFi density, depending on a comprehensive database of WiFi access points. Further, a LORAN type system or LoJack® type system might be adapted for the purpose of location determination. As noted in U.S. Pat. No. 10,796,340, which is incorporated herein by reference, camera images and the location data of proximate smartphones, laptops, and personal communication devices can also be used to determine location.

The most typical examples of the communications subsystem 122 are wireless cellular systems (e.g., Global System for Mobile Communications (GSM), Universal Mobile Telecommunications System (UMTS)-time division duplexing (TDD), Long-Term Evolution (LTE), 4th Generation (4G), or 5th Generation (5G)), and the like. Less typically, the communications subsystems may be enabled with WLAN IEEE 802.11 (WiFi), or even Long Range Wireless transceiver. Some examples of a Long Range Wireless system include Digital Enhanced Cordless Telecommunications (DECT), Evolution-data Optimized (EVDO), General Packet Radio Service (GPRS), High Speed Packet Access (HSPA), IEEE 802.20 (iBurst), Multichannel Multipoint Distribution Service (MMDS), Muni WiFi, commercial satellite, and IEEE 802.16 Worldwide Interoperability for Microwave Access (WiMAX (WiBro)). The system 100 is not limited to any particular type of communication subsystem.

The access point and/or communications subsystem can be used to collect client data from entities passing by, or engaging with the access point, or using the communications subsystem. This data can be stored in the local IP file 128 for subsequent recovery or transmission to a server in support of data gathering or geofencing data. In support of data mapping, the access point is publically accessible to user devices that include smartphones, personal devices, or generally any type of computing device. Typically, the user devices are enabled for WiFi and Bluetooth communications. If left enabled (searching, as is the typical case for many users), the user device is able to interact with a nearby access point even if a communication data link is not established. As used herein, the term data mapping may include the collection of data from the user devices. In one aspect, user data information (e.g., addresses) is collected voluntarily, with the user explicitly agreeing to data collection in response to an access point provided services, such as the provision of an Internet browser, email, social media services, or smartphone applications.

As used herein, an "entity" or "user" may be a person, a business, a corporation, any type of social organization or business unit, a physical device, or a software application. For simplicity, the entities may be identified as the hardware components being used by, or associated with a business, person, corporation, or social organization. In this case, the entity may be described as a computer, smartphone, media projection subsystem, server, or vehicle, to name a few examples.

Figure 4:
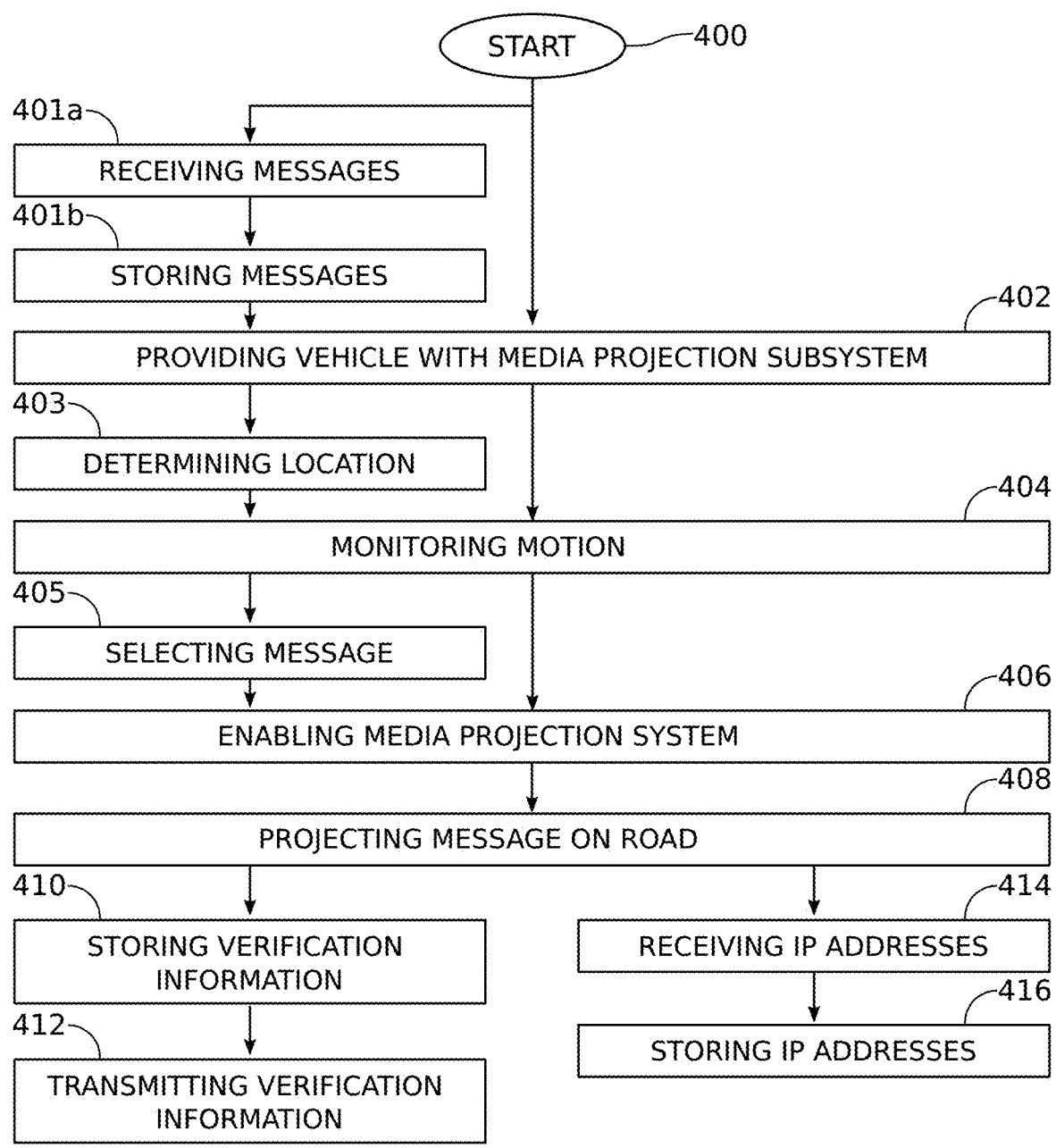
FIG. 4 is a flowchart illustrating a method for open cockpit vehicle public interest messaging.

FIG. 4 is a flowchart illustrating a method for open cockpit vehicle public interest messaging. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method steps are supported by the above system descriptions and, generally, the method follows the numeric order of the depicted steps. The method starts at Step 400.

Step 402 provides an open cockpit vehicle with a media projection subsystem (MPS) configured to project media messages. Step 404 monitors motion proximate to the vehicle. Step 406 selectively enables the MPS in response to the motion monitoring, and in Step 408 the MPS projects a media message on a road surface adjacent to the vehicle. Optionally, Step 408 projects the image on the road surface in a direction of vehicle movement.

In one aspect, monitoring motion proximate to the vehicle in Step 404 includes detecting motion such as movement of the open cockpit vehicle, a change in imaging proximate to the vehicle, or a change in audio level proximate to the vehicle. Then, selectively enabling the MPS in Step 406 includes enabling the MPS in response to the detected motion. Alternatively, Step 404 may determine that the vehicle is stationary, with a lack of vehicle movement, and Step 406 enables the MPS in response to the lack of vehicle movement.

In one aspect Step 402 also provides a library including a plurality of media messages. Step 405 selects a media message from the library, and selectively enabling the MPS in Step 406 includes enabling the MPS to project the selected media message.

In another aspect, Step 403 determines the geographic location of the vehicle, and the library provided in Step 402 includes a plurality of media messages cross-referenced to geographic locations. Then, in Step 406 the MPS is enabled to project a media message in response to determining the geographic location. That is, some messages are intended to be projected primarily in certain locations.

In one aspect, Step 410 stores verification information in a non-transitory memory with content such as the media message selected for projection, a cross-referencing time, and a cross-referencing geographic location. Optionally, Step 412 wirelessly communicates the verification information to a server.

In another aspect, Step 401a wirelessly receives media messages, and Step 401b stores the received media messages in a non-transitory memory. Step 414 may wirelessly receive IP addresses and Step 416 stores the IP addresses in a non-transitory geofence memory.

In one other aspect, Step 402 provides a mapping software application stored in a non-transitory memory, to supply a map image corresponding a determined geographic location. Then, selectively enabling the MPS in Step 406 includes the MPS projecting the map image.

FIGS. 5A through 5D are drawings depicting a first variation of turret system for portable projection deployment. As shown in partial cross-section in FIG. 5A, the system 500 comprises a base 502 having a top surface 504 and a bottom surface 506. A media projection subsystem (MPS) 508 attached to the base 502 has a display surface 510 aligned in a vertical plane 512. When mounted on the roofs of automobiles, the MPSs are often referred to as "toppers". In one aspect, the MPS 508 has two display surfaces, one on each side of the MPS (only one surface is shown). A first attachment mechanism 514 mounts the MPS 508 to the base 502. In this example the first attachment mechanism 514 is screw or bolt fasteners. A rotation mechanism 516 is attached to the base 502 and configured to horizontally rotate the MPS display surface 510 vertical plane. In this example, the rotation mechanism is a rotating collar 516. Latch 520 attaches crossbar 522 to a station, such as a vehicle roof top rain gutter. Clamps 518 may be used to lock the MPS 508 into a fixed position after it is rotated. It should be understood that a number of attachment mechanisms exist that would be known by one of skill in the art that could be used as an alternative to what is shown. As described in detail in the parent applications, and incorporated herein by reference, the station or mobile platform may include automobiles (see FIG. 6B), trucks, aerial drone, boats, and kiosks.

Conventionally when mounted on automobile roofs, the topper display (MPS) is locked into a fixed alignment "parallel" to the direction of vehicle travel. This alignment is at least partially due to the need to minimize air resistance, as these topper displays are designed to project imagery while the car is in motion, on its way from Point A to Point B. As a result, the topper is not necessary aligned in the optimal viewing angle for pedestrians or the drivers of other automobiles. The rigid mounting of the topper to an automobile roof prevents the alignment of the topper to be adjusted even in situations where air resistance is not an issue, for example when the vehicle is motionless (i.e., parked) for extended periods of time. The turret systems described herein were designed in recognition that topper displays are more practically viewed when vehicles are not in motion, and given that freedom from air resistance concerns, that it would be advantageous to modify the topper display viewing angle based upon instant conditions or objectives.

Figure 5A:
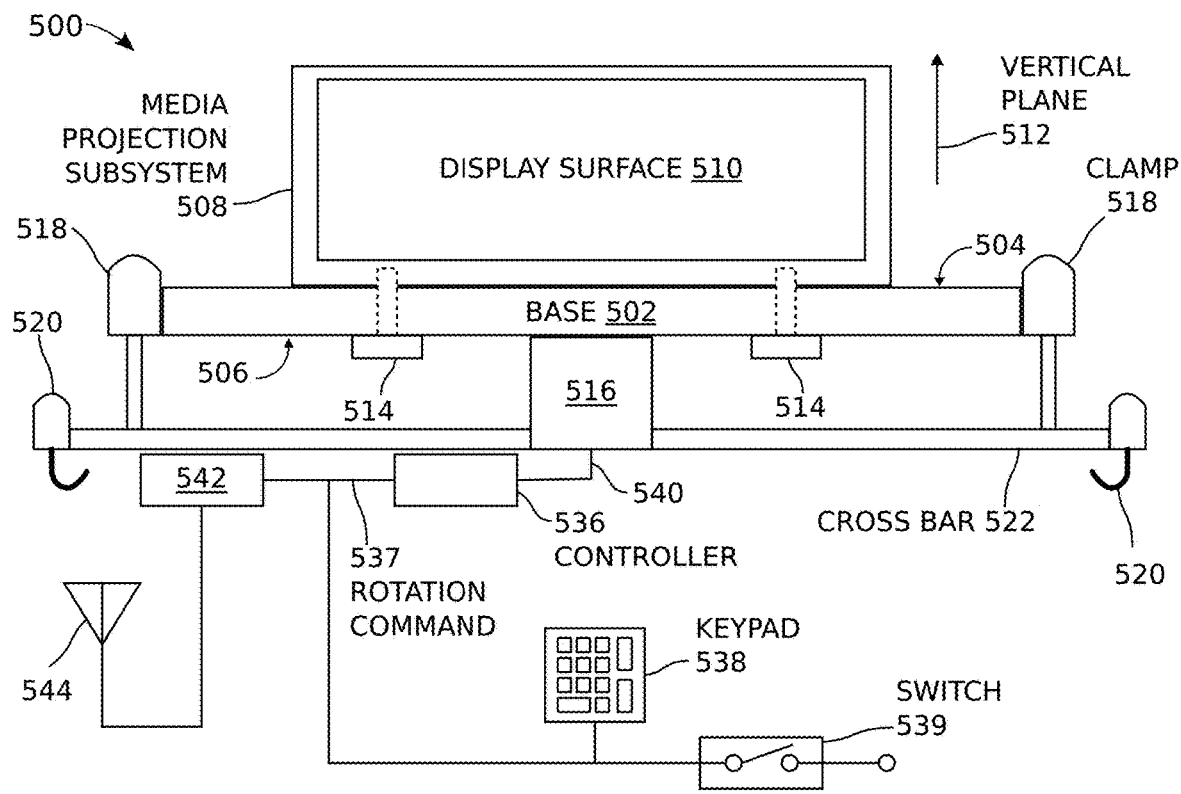
FIGS. 5A through 5D are drawings depicting a first variation of the turret system for portable projection deployment.
Figure 5B:
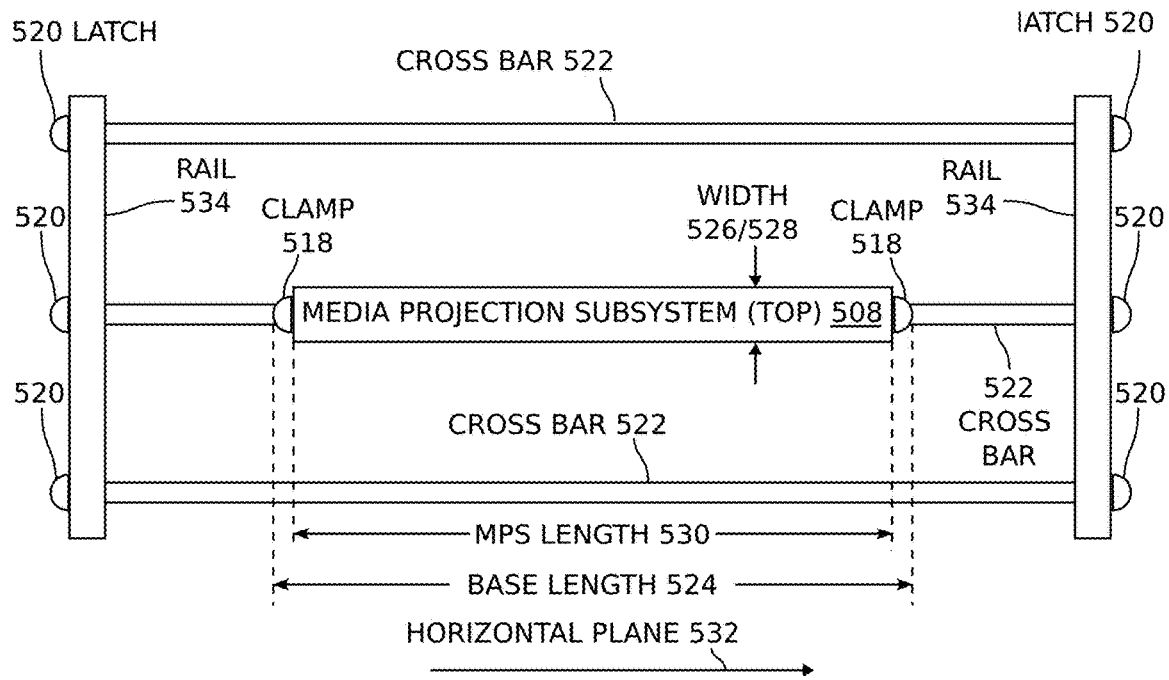
Figure 5C:
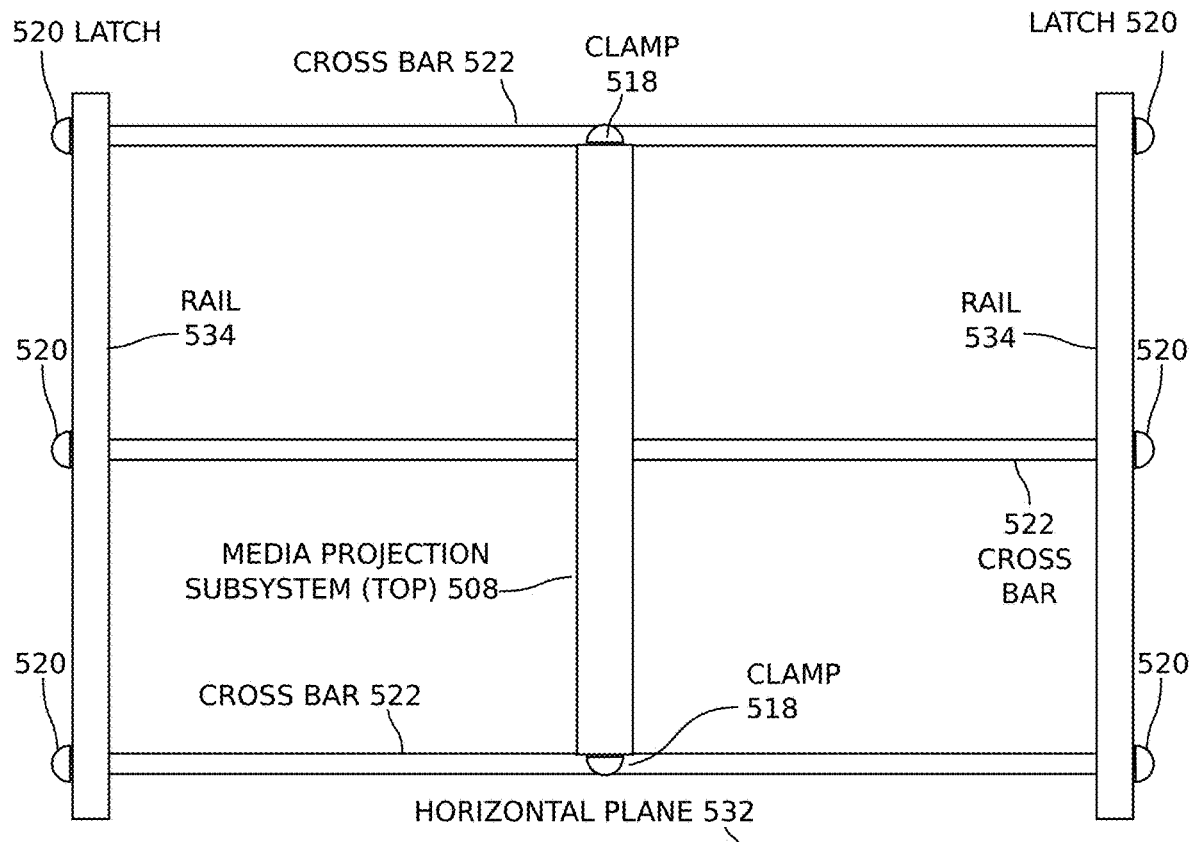

FIGS. 5B and 5C are top-down plan views of the turret system. In these examples, the base is formed with a length 524 in a horizontal plane 532 and a width 526 in the horizontal plane, orthogonal to the base length. Since the base cannot be seen in these views, it is assumed that the width 528 of the MPS 508 is the same as the base width 526. The MPS 508 display surface has a length 530 aligned with the base length 524, and the width 528 aligned with the base width 526. Comparing FIGS. 5B and 5C it can be seen that the rotation mechanism is configured to horizontally rotate the orientation of the MPS display surface 510. In one aspect as shown, the MPS display surface can be rotated in orthogonal horizontal directions, but it should be understood that in other aspects the MPS display surface can be rotated in a plurality of horizontal directions or spun in a horizontal circle (see FIG. 5D). In this example, the rotation mechanism includes three parallel crossbars 522 and connecting support rails 534. The collar (not shown) is mounted on the center crossbar. Again, it should be understood that the system is not limited to exemplary mounting and rotation mechanisms.

Returning to FIG. 5A, in one aspect the system optionally includes a controller 536 and the rotation mechanism includes an internal electrical motor (not shown). The controller 536 has an interface to accept rotation commands on line 537, and an interface connected to the motor 538 on line 540 to supply rotation signals enabling the motor. In one aspect the system 500 includes a wireless communications device 542 having an interface (e.g., antenna 544) to wirelessly receive rotation commands and an interface on line 546 to relay the rotation commands to the controller 536. Alternatively, rotation commands can be source from a keypad 538 or a switch 539.

Figure 5D:
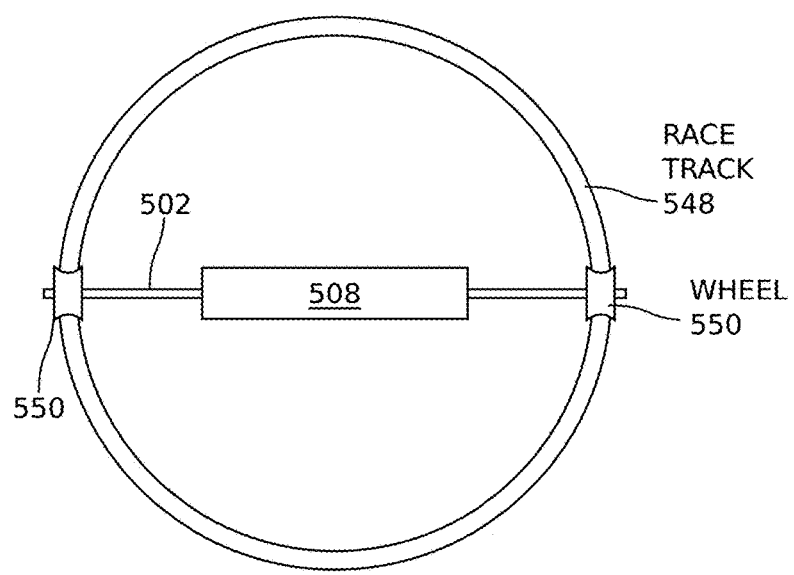

FIG. 5D is a top-down plan view of turret system 500 where the rotation mechanism includes a racetrack 548. The base 502 comprises wheels 550 mounted to its proximate and distal ends, riding on the racetrack 548. This design permits the MPS to be aligned in a plurality of orientations and/or continuously spun.

FIGS. 6A through 6F depict another variation of the turret system for portable projection deployment. Viewing FIG. 6A, the system 600 comprises a lower platform 602 having a top surface 604 and a bottom surface 606. An upper platform 608 has a top surface 610 and a bottom surface 612 overlying the lower base top surface 604. A media projection subsystem (MPS) 614 is mounted to the upper platform top surface 610, having a display surface 616 aligned in a vertical plane 618, typically orthogonal to the upper platform top surface 610. A rotation mechanism 620 is interposed between the lower platform 602 and upper platform 608, permitting a horizontal plane 613 rotation of the MPS display 614.

Figure 6A:
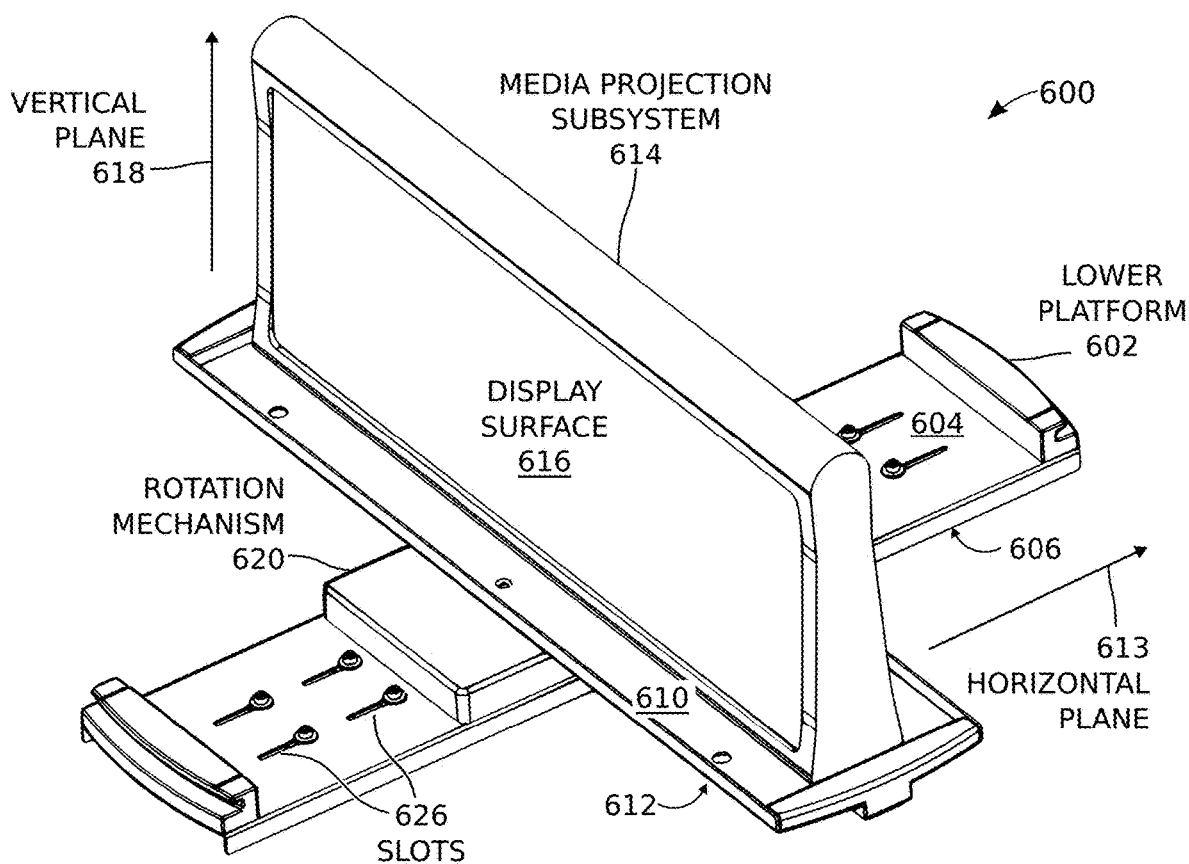
Figure 6B:
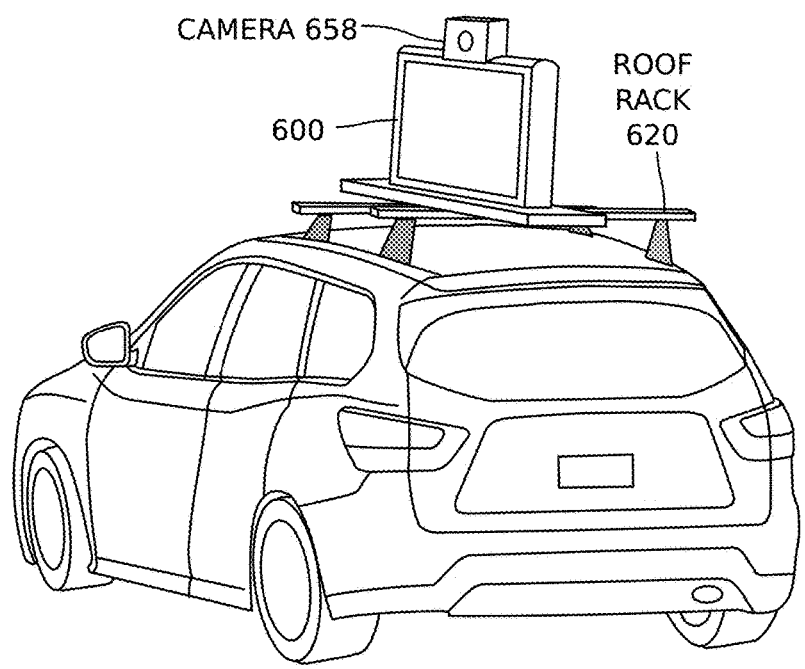

In FIG. 6B the turret system is shown mounted a vehicle roof rack 622. More generally, but not explicitly shown, the turret system lower platform can also be attached to kiosk (see FIGS. 10A and 10B) and aerial drone stations.

Figure 6C:
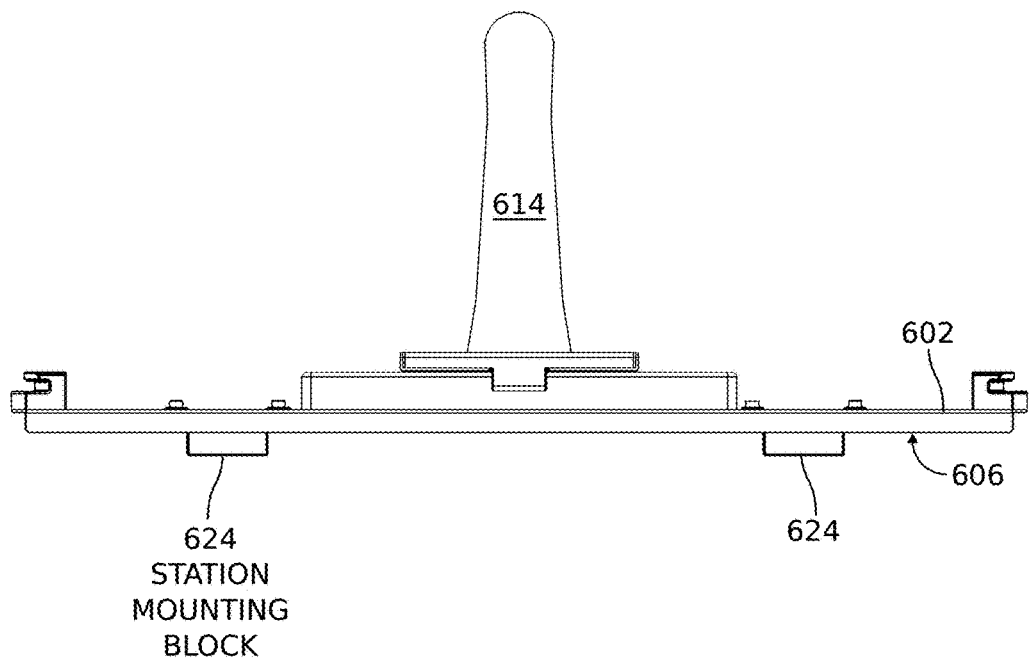

FIG. 6C depicts station mounting brackets 624 attached to the lower platform bottom surface 606. Referring briefly again the FIG. 6A, it can be seen that slots 626 permit the mounting brackets to accommodate a variety of roof rack styles and mountings.

Figure 6D:
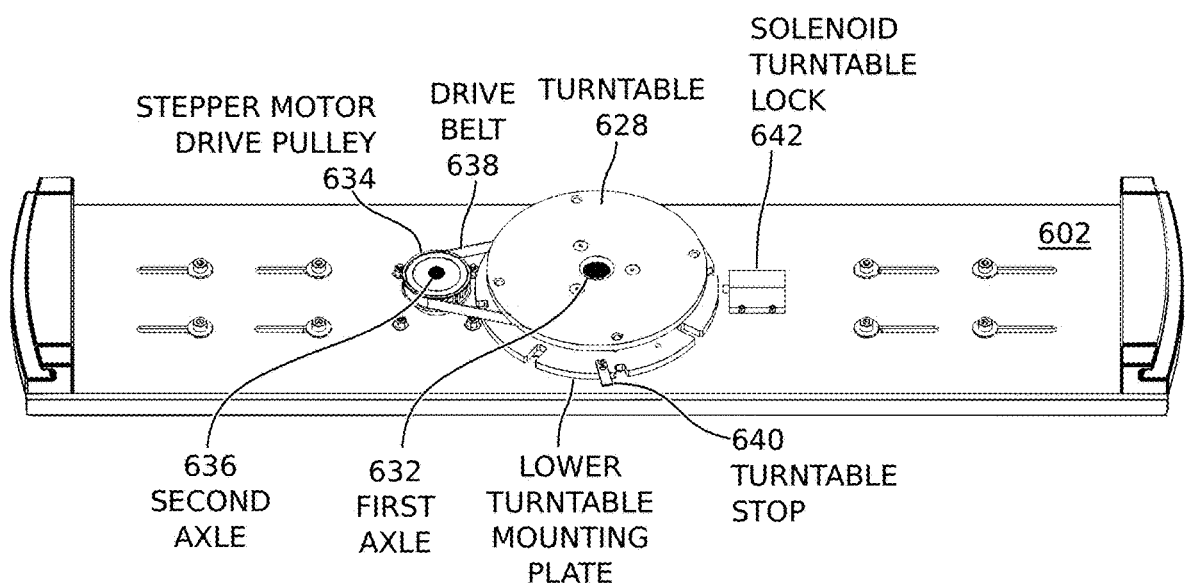

FIG. 6D depicts an exemplary rotation mechanism. A turntable 628 has a top surface 630 connected to the upper platform bottom surface (not shown in this figure), rotatable around a first axle 632 formed through the lower platform 602. A pulley 634 is centered around a second axle 636 formed through the lower platform 602, and a drive belt 638 engages the turntable 628 and the pulley 634. As an alternative to the drive belt system, the pulley and turntable may be connected through a system of meshed gears (not shown). The system may also include a turntable locking mechanism engageable to lock the turntable 628 in a fixed position. One example shown is a turntable stop 640 that prevents the turntable from advancing beyond a predetermined position. A solenoid turntable lock 642 locks the turntable into a selected position after rotation.

In FIG. 6E the rotation mechanism may further comprise an electric motor 644 with a rotatable drive shaft forming the second axle 636. A controller 646 having an interface on line 648 accepts rotation commands, and has an interface connected to the electric motor on line 650 to supply rotation signals enabling the electric motor drive shaft. As shown, a wireless device 656 is used to supply rotation commands. For example, the rotation commands may be Bluetooth signals sourced from a proximately located key fob or smartphone application. Otherwise, the wireless communications device 656 may be a WiFi or cellular device to accept instructions from remote locations. As shown in FIG. 5A, the controller 646 may be a simple switch, or enabled by a binary switch or logic-enabled keypad. In one aspect, a turntable position sensor 652, which may for example be an optical device, has an interface on line 654 to supply location signals in response to determining a turntable position (e.g. from markings on the turntable bottom surface). The controller 646 has an interface to receive the location signals on line 654 and enables the electric motor in response to the location signals.

FIG. 6F depicts a variation where to electric motor drive shaft 636 is directly connected to the turntable 628.

Figure 7:
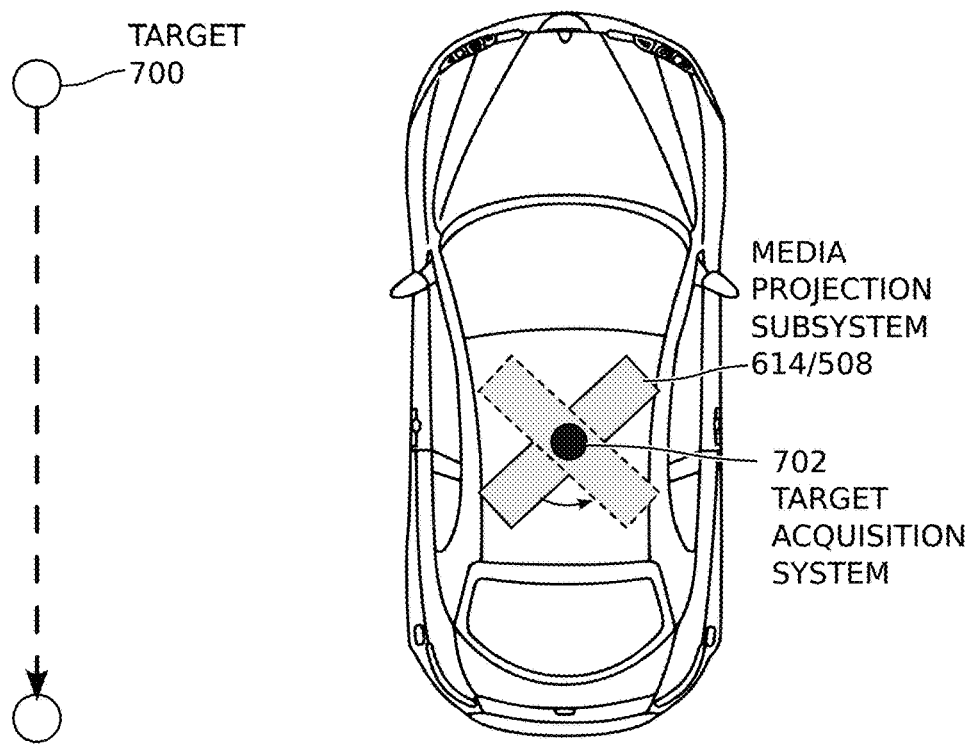
FIG. 7 is a top-down plan view of a turret system mounted on the roof of a car highlighting a tracking or motion detection function.

FIG. 7 is a top-down plan view of a turret system 500/600 mounted on the roof of a car highlighting a tracking or motion detection function. The controller receives rotation commands from a target acquisition mechanism 702 tracking or detecting a target 700 proximately located with the turret system and sends rotation signals directing the rotation mechanism to turn the MPS 508/614 display surface towards the target. The target acquisition mechanism 702 may be enabled with wireless devices and/or cameras (e.g., camera 658, see FIG. 6B) to directly identify persons, radio frequency signals, or IP addresses (targets), and provide rotation commends for rotating the MPS 508/614 in a direction responsive to the target commands. Alternatively, the rotation commends may be supplied from a remote server able to independently track targets, and the rotation commands are received by wireless communications device 656 (see FIG. 6E). Geofencing and data gathering techniques have been presented above and in the parent applications incorporated herein by reference.

Figure 8A:
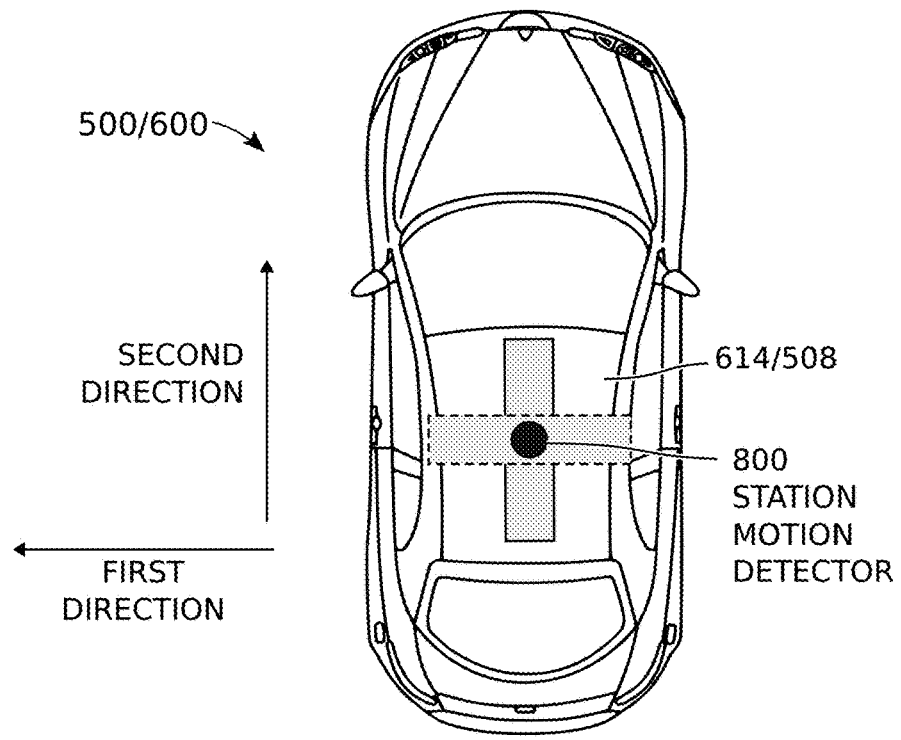
FIG. 8A is a top-down plan view showing a practical application of the turret system.

FIG. 8A is a top-down plan view showing a practical application of the turret system. Again, the turret system 500/600 is mounted to the roof of an automobile. When aligned in the first direction the MPS display surface 614 has a minimum of air resistance when the mobile platform is in motion, and when in the second direction the MPS display surface presents with a maximum of air resistance when the mobile platform is in motion, but with a favorable viewing angle. Alternatively stated, the MPS display surface 510 is presented in the first direction when the mobile platform is in motion and (optionally) in the second direction when the mobile platform is at rest. This function may be implemented automatically, e.g., for reasons of safety, if the system is equipped with a station motion detection device 800, such as a GPS receiver or accelerometer with an output operatively connected to the controller. In one aspect, the first direction is orthogonal to the second direction.

Figure 8B:
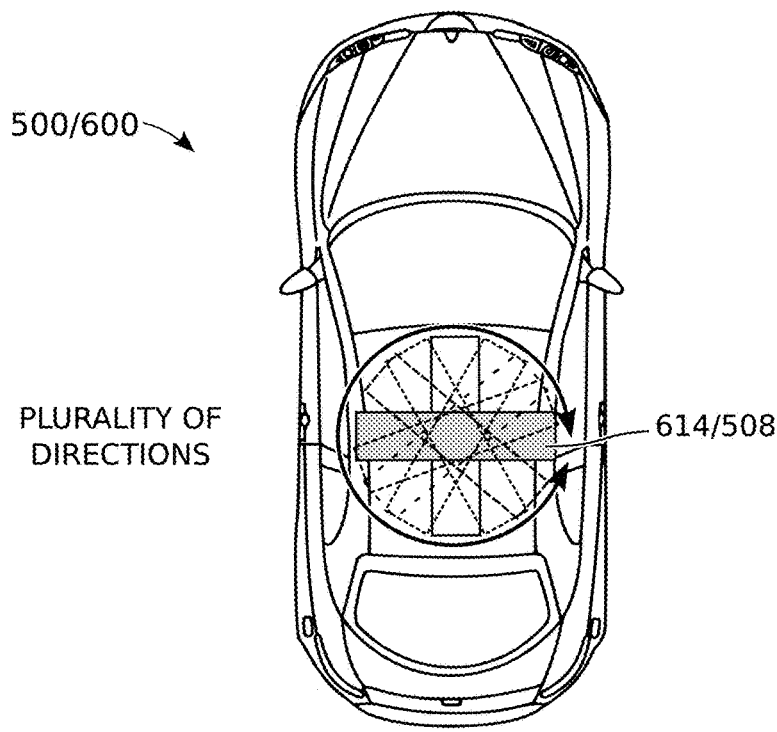
FIG. 8B is a top-down plan view showing another practical application of the turret system.

FIG. 8B is a top-down plan view showing another practical application of the turret system. Again, the turret system 500/600 is mounted to the roof of an automobile. Here, the rotation mechanism is enablable to orient the MPS display surface in a plurality of horizontal directions. In one aspect, the rotation mechanism is configured to spin the MPS display surface in a horizontal circle.

Figure 9:
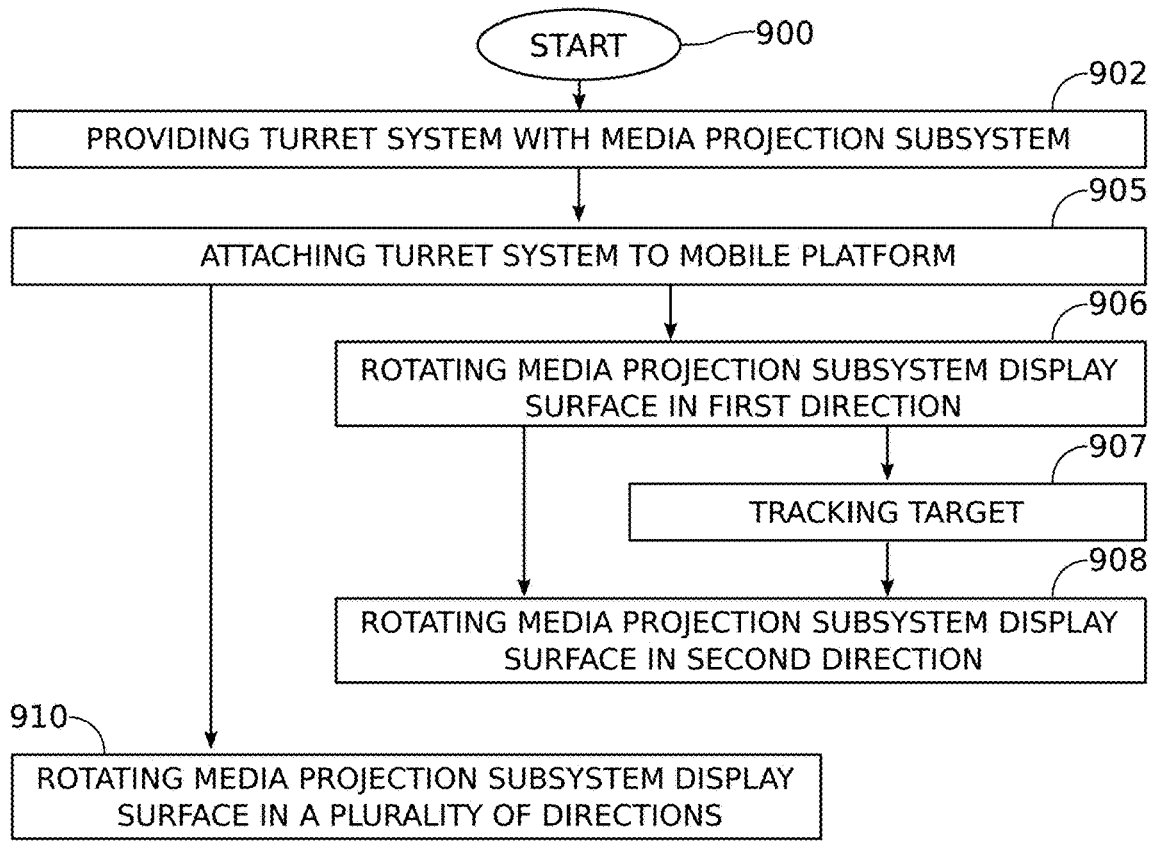
FIG. 9 is a flowchart illustrating a method for portable projection turret deployment.

FIG. 9 is a flowchart illustrating a method for portable projection turret deployment. The method begins at Step 900. Step 902 provides a rotatable turret system with the MPS having a display surface aligned in a vertical plane. Step 904 attaches the MPS to a mobile platform or station. At a first time, Step 906 horizontally rotates the MPS display surface vertical plane in a first direction, and at a second time Step 908 horizontally rotates the MPS display surface vertical plane in a second direction. In one aspect, the first direction is orthogonal to the second direction. For example, Step 906 may rotate the MPS display surface in the first direction when the mobile platform is in motion and Step 908 may rotate the MPS display surface in the second direction when the mobile platform is at rest. Alternatively, Step 910 horizontally rotates the MPS display surface vertical plane in a plurality of directions, for example, spinning the MPS display surface vertical plane in a horizontal circle. In one aspect, Step 907 tracks a target proximately located with the turret system. Then, horizontally rotating the MPS display surface vertical plane in the second direction in Step 908 includes rotating the MPS display surface to face the target.

FIGS. 10A and 10B are diagrams depicting kiosks enabled with rotating turret MPSs. Details of portable and stationary kiosks have been provided above and in the parent applications, which are incorporated herein by reference. In FIG. 10A a turret system 500/600 with rotatable MPS 508/614 is optionally mounted on the roof of a valet booth 1000. Other non-rotatable displays 1002 may also be mounted to the booth. In FIG. 10B a mobile outdoor reservation table 1002 (e.g., for a restaurant) is shown with MPS 508/614.

Systems and methods have been provided for open cockpit public service messaging and turret deployment. Examples of particular message structures, schematic block linkages, and hardware units have been presented to illustrate the invention. However, the invention is not limited to merely these examples. Other variations and embodiments of the invention will occur to those skilled in the art.

We claim:

1. A turret system for portable projection deployment, the system comprising:
   a lower platform having a top surface and a bottom surface;
   an upper platform having a top surface and a bottom surface overlying the lower platform top surface;
   a media projection subsystem (MPS) mounted to the upper platform top surface, having a display surface aligned in a vertical plane orthogonal to the upper platform top surface;
   a rotation mechanism interposed between the lower platform and upper platform, permitting a horizontal plane rotation of the MPS display; and,
   enabling the MPS display surface when the upper platform is stationary with respect to the lower platform.

2. The system of claim 1 wherein the lower platform is rigidly attachable to a mobile station selected from the group consisting of a vehicle roof rack, a kiosk, and an aerial drone.

3. The system of claim 1 further comprising:
   station mounting brackets attached to the lower platform bottom surface.

4. The system of claim 1 wherein the rotation mechanism comprises:
   a turntable with a top surface connected to the upper platform bottom surface, rotatable around a first axle formed through the lower platform;
   a pulley connected to a second axle formed through the lower platform; and,
   a drive belt engaging the turntable and the pulley.

5. The system of claim 4 further comprising:
   a turntable locking mechanism engageable to lock the turntable in a fixed position.

6. The system of claim 5 wherein the rotation mechanism further comprises:
   an electric motor with a rotatable drive shaft forming the second axle; and,
   a controller having an interface to accept rotation commands, and an interface connected to the electric motor to supply rotation signals enabling the electric motor drive shaft.

7. The system of claim 6 wherein the controller is a device selected from the group consisting of a switch, logic-enabled keypad, and logic-enabled wireless communications subsystem.

8. The system of claim 6 further comprising:
   a turntable position sensor having an interface to supply location signals in response to determining a turntable position; and,
   wherein the controller has an interface to receive the location signals and enables the electric motor in response to the location signals.

9. The system of claim 1 wherein the rotation mechanism is configured to orient the MPS display surface in a direction selected from the group consisting of a first horizontal plane direction and an opposing second horizontal plane direction.

10. The system of claim 9 wherein a first horizontal plane is orthogonal to a second horizontal plane.

11. The system of claim 9 wherein the rotation mechanism is enablable to orient the MPS display surface to a plurality of horizontal planes.

12. The system of claim 11 wherein the rotation mechanism is configured to spin the MPS display surface in a circle of horizontal planes.

13. The system of claim 11 further comprising:
   a target acquisition mechanism with an interface to supply target commands;
   wherein a rotation mechanism controller has an interface to receive the target commands for rotating the MPS in a horizontal plane direction responsive to the target commands.

14. The system of claim 2 wherein a first horizontal plane presents the MPS display surface with a minimum of air resistance when the mobile station is in motion; and,
   wherein the second horizontal plane presents the MPS display surface with a maximum of air resistance when the mobile station is in motion.

15. The system of claim 14 wherein the MPS display surface is presented in the first horizontal plane when the station is in motion; and,
   wherein the MPS display surface is presented in the second horizontal plane when the station is at rest.

16. A method for portable projection turret deployment, the method comprising:
   providing a rotatable turret system with a media projection subsystem (MPS) having a display surface aligned in a vertical plane;
   at a first time, rotating the MPS display surface to align in a first horizontal plane direction, as viewed from a plan perspective;
   at a second time, rotating the MPS display surface in a second horizontal plane direction; and,
   subsequent to rotation, enabling the MPS display surface.

17. The method of claim 16 wherein the first horizontal plane direction is opposed to the second horizontal plane direction.

18. The method of claim 16 further comprising:
   rotating the MPS display surface in a plurality of horizontal planes.

19. The method of claim 18 wherein rotating the MPS display surface in a plurality of horizontal plane directions includes spinning the MPS display surface in a circle of horizontal planes.

20. The method of claim 16 further comprising:
   tracking a target proximately located with the turret system; and,
   wherein rotating the MPS display surface in the second horizontal plane direction includes rotating the MPS display surface to face the target.

21. The method of claim 16 further comprising:
   attaching the turret system to a station capable of motion;
   detecting station motion;
   wherein rotating the MPS display surface in the first horizontal plane direction includes rotating the MPS display surface to a first horizontal plane endpoint when the station is in motion; and,
   wherein rotating the MPS display surface in the second horizontal plane direction includes rotating the MPS display surface to a second horizontal plane endpoint when the station is at rest.

22. A mobile station turret alignment system, the system comprising:
   a lower platform having a top surface and a bottom surface, with the bottom surface fixedly attached to a mobile station;
   an upper platform having a top surface, and with a bottom surface overlying the lower platform top surface;

a rotation mechanism fixedly attached to the upper and lower platforms, permitting a horizontal plane rotation of the upper platform with respect to the lower platform;

wherein the upper platform is rotated to a first horizontal plane endpoint at a first time to minimize air resistance when the mobile station is in motion; and, wherein the upper platform in rotated to a second horizontal plane endpoint, orthogonal to the first horizontal plane endpoint, at a second time.

* * * * *